US009069683B2

(12) United States Patent
Beardsley et al.

(10) Patent No.: US 9,069,683 B2
(45) Date of Patent: *Jun. 30, 2015

(54) SYSTEMS AND METHODS FOR DESTAGING STORAGE TRACKS FROM CACHE (71) Applicant: International Business Machines Corporation, Armonk, NY (US)

(72) Inventors: Brent C. Beardsley, Tucson, AZ (US); Michael T. Benhase, Tucson, AZ (US); Lokesh M. Gupta, Tucson, AZ (US); Sonny E. Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,319

(22) Filed: Jan. 17, 2014

(65) Prior Publication Data
US 2014/0136790 A1 May 15, 2014

Related U.S. Application Data (63) Continuation of application No. 12/965,174, filed on Dec. 10, 2010, now Pat. No. 8,661,202.

(51) Int. Cl.
*G06F 12/00* (2006.01)
*G06F 12/08* (2006.01)

(52) U.S. Cl.
CPC ........ *G06F 12/0891* (2013.01); *G06F 12/0804* (2013.01)

(58) Field of Classification Search
USPC .................................................. 711/129, 154
See application file for complete search history.

(56) References Cited

U.S. PATENT DOCUMENTS

| 6,615,332 | B2 | 9/2003 | Yamamoto et al. |
| 7,085,892 | B2 | 8/2006 | Martinez et al. |
| 7,191,207 | B2 | 3/2007 | Blount et al. |
| 7,721,043 | B2 | 5/2010 | Gill et al. |
| 7,725,661 | B2 | 5/2010 | Liu et al. |
| 7,783,836 | B2 | 8/2010 | Wang |
| 7,793,049 | B2 | 9/2010 | Cain et al. |
| 7,805,574 | B2 | 9/2010 | Bell, Jr. et al. |
| 2003/0028819 | A1 | 2/2003 | Chiu et al. |
| 2003/0225948 | A1 | 12/2003 | Jarvis et al. |
| 2007/0156961 | A1 | 7/2007 | Houzenga et al. |
| 2010/0037226 | A1 | 2/2010 | Benhase et al. |

OTHER PUBLICATIONS

Young et al., "An Adaptive High-Low Water Mark Destage Algorithm for Cached RAID5", 8 pages, Proceedings 2002 Pacific Rim International Symposium on Dependable Computing, Dec. 16-18, 2002, Tsukuba City, Ibaraki, Japan.

(Continued)

*Primary Examiner* — Matthew Bradley
(74) *Attorney, Agent, or Firm* — Griffiths & Seaton PLLC (57) ABSTRACT A system includes a cache and a processor coupled to the cache. The cache stores data in multiple storage tracks and each storage track includes an associated multi-bit counter. The processor is configured to perform the following method. One method includes incrementing the multi-bit counter on each respective storage track a predetermined amount each time the processor writes to a respective storage track. The method further includes decrementing each multi-bit counter each scan cycle, and destaging each storage track including a zero count.

20 Claims, 3 Drawing Sheets (56) References Cited

OTHER PUBLICATIONS

U.S. Appl. No. 12/965,131, "Systems and Methods for Managing Cache Destage Scan Times", filed Dec. 10, 2010.
U.S. Appl. No. 12/965,141, Systems and Methods for Background Destaging Storing Tracks, filed Dec. 10, 2010.
U.S. Appl. No. 12/965,174, Systems and Methods for Destaging Storage Tracks From Cache, filed Dec. 10, 2010.
U.S. Appl. No. 12/965,133, filed Dec. 10, 2010, entitled "Systems and Methods for Managing Destage Conflicts."

SYSTEMS AND METHODS FOR DESTAGING STORAGE TRACKS FROM CACHE

CROSS-REFERENCE TO RELATED APPLICATIONS

This application is a Continuation of U.S. patent application Ser. No. 12/965,174, filed on Dec. 10, 2010, the contents of which are incorporated herein by reference. The application is also related to copending U.S. patent application Ser. No. 13/493,802, filed on Jun. 11, 2012.

BACKGROUND OF THE INVENTION

1. Field of the Invention

The present invention relates in general to computing systems, and more particularly to, systems and methods for destaging storage tracks from cache utilizing a multi-bit counter.

2. Description of the Related Art

Contemporary storage systems use a one-bit counter associated with each respective storage track to determine when to destage each respective storage track from cache. In these storage systems, the bit is set each time its storage track is written to and decremented during each destage scan of the cache. While this is an effective way of destaging the cache, these storage systems are not as effective as they otherwise could be when there are relatively few storage tracks in the cache and/or when the storage tracks in the cache are in sequential order with respect to one another.

SUMMARY OF THE INVENTION

Various embodiments provide systems for destaging storage tracks from cache. One method comprises writing, by a processor coupled to the cache, data to the plurality of storage tracks and incrementing the multi-bit counter on each respective storage track a predetermined amount each time the processor writes to a respective storage track. The method further comprises scanning each of the plurality of storage tracks in each of a plurality of scan cycles, decrementing each multi-bit counter each scan cycle, and destaging each storage track that includes a zero count.

In one embodiment, a method is provided for destaging storage tracks from cache using at least one processor device in a computing environment. In one embodiment, by way of example only, a multi-bit counter is incremented on each respective storage track a predetermined amount each time the processor writes to a respective storage track. The method further comprises decrementing each multi-bit counter each scan cycle, and destaging each storage track that includes a zero count.

In another embodiment, a computer system is provided for destaging storage tracks from cache using at least one processor device, in a computing environment. The computer system includes a computer-readable medium and a processor in operable communication with the computer-readable medium. In one embodiment, by way of example only, the processor, increments a multi-bit counter on each respective storage track a predetermined amount each time the processor writes to a respective storage track. The computer system further comprises scanning each of the plurality of storage tracks in each of a plurality of scan cycles, decrementing each multi-bit counter each scan cycle, and destaging each storage track that includes a zero count.

In a further embodiment, a computer program product is provided for destaging storage tracks from cache using at least one processor device, in a computing environment. The computer-readable storage medium has computer-readable program code portions stored thereon. The computer-readable program code portions include executable portions that increments a multi-bit counter on each respective storage track a predetermined amount each time the processor writes to a respective storage track. The computer program product further comprises computer-readable program code portions include executable portions that decrements each multi-bit counter each scan cycle, and destaging each storage track that includes a zero count.

In addition to the foregoing exemplary method embodiment, other exemplary system and computer product embodiments are provided and contribute related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems and methods for destaging storage tracks from cache utilizing a multi-bit counter. Also provided are physical computer storage mediums (e.g., an electrical connection including one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product for destaging storage tracks from cache utilizing a multi-bit counter.

Figure 1:
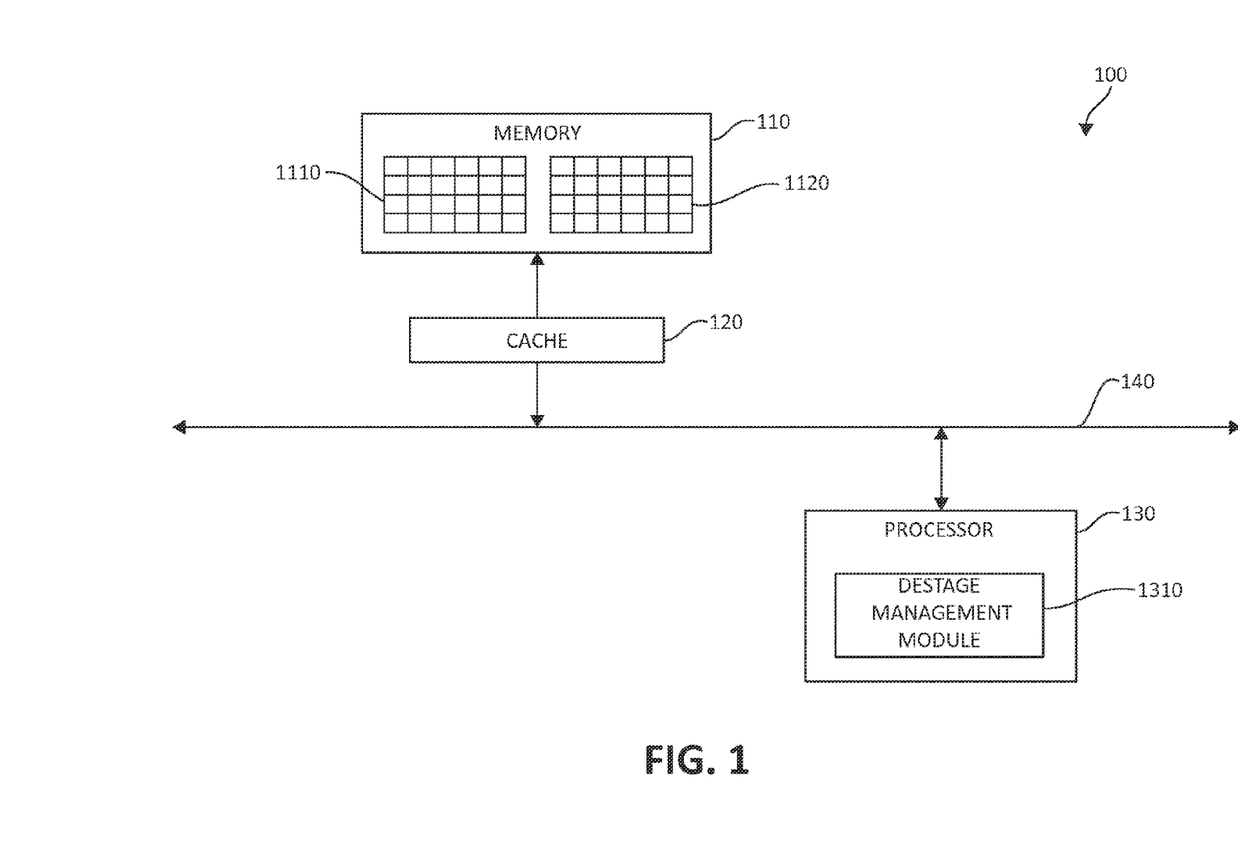
FIG. 1 is a block diagram of one embodiment of a system for destaging storage tracks from a cache utilizing a multi-bit counter.

Turning now to the figures, FIG. 1 is a block diagram of one embodiment of a system 100 for destaging storage tracks from cache utilizing a multi-bit counter. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing.

In the various embodiments of memory 110, storage tracks 1110 are capable of being stored in memory 110 and each storage track 1110 comprises a counter 1120. In one embodiment, each counter 1120 is a four-bit (4-bit) counter. In other embodiments, each counter 1120 is a two-bit (2-bit) counter or a three-bit (3-bit) counter. In still other embodiments, each counter 1120 includes a number of bits greater than four (4) bits. Furthermore, each of the storage tracks 1110 can be individually or collectively destaged to memory 110 from cache 120 when data is written to the storage track(s) 1110.

Cache 120, in one embodiment, comprises a write cache partitioned into one or more ranks, where each rank includes one or more storage tracks 1110. As such, cache 120 may be any cache known in the art or developed in the future.

During operation, the storage tracks 1110 in each rank are destaged to memory 110 in a foreground destaging process after the storage tracks 1110 have been written to. That is, the foreground destage process destages storage tracks 1110 from the ranks to memory 110 while a host (not shown) is actively writing to various storage tracks 1110 in the ranks of cache 120. Ideally, a particular storage track 1110 is not being destaged when one or more hosts desire to write to the particular storage track 1110, which is known as a destage conflict, and cache 120 does not experience large fluctuations between being nearly full and nearly empty, which is known as oscillation. To reduce the number of destage conflicts and to reduce the time in which the storage tracks reside in cache 120, processor 130 is configured to execute a method for destaging storage tracks from cache utilizing the counter 1120 associated with each storage track 1110 in cache 120.

In various embodiments, processor 130 comprises or has access to a destage management module 1310, which comprises computer-readable code that, when executed by processor 130, causes processor 130 to perform the method for destaging storage tracks from cache utilizing the counter 1120 associated with each storage track 1110 in cache 120. When executing the computer-readable code in destage management module 1310, processor 130 is configured to utilize a first thread to write data to storage tracks 1110 and increment the counter 1120 on each respective storage track 1110 a predetermined amount each time processor 130 writes to a respective storage track 1110. In one embodiment, processor 130 is configured to increment each counter 1120 on each respective storage track 1110 three (3) counts each time processor 130 writes to a respective storage track 1110. In another embodiment, processor 130 is configured to increment each counter 1120 on each respective storage track 1110 one (1) count or two (2) counts each time processor 130 writes to a respective storage track 1110. In yet another embodiment, processor 130 is configured to increment each counter 1120 on each respective storage track 1110 a number of counts greater than three counts each time processor 130 writes to a respective storage track 1110.

In one embodiment, each counter 1120 is a four-bit counter including a count range of, for example, 0-15 and the predetermined increment amount is three (3) counts. In this embodiment, processor 130 is configured to increment the counter 1120 associated with a particular storage track 1110 three (3) counts each time processor 130 writes to the particular storage track 1110. As such, each counter 1120 in this embodiment is capable of tracking five consecutive write operations (i.e., 15 counts divided by 3 counts per write=5 writes) on each respective storage track 1110.

Other embodiments, contemplate the use of counters 1120 including different bit sizes and/or a different predetermined increment amount each time processor 130 writes to a storage track 1110. That is, the various embodiments of processor 130 may use any combination of bit sizes for counters 1120 and predetermined increment amounts (e.g., a two-bit counter and one count per write (i.e., tracks 3 writes from processor 130 for each storage track 1110), a three-bit counter and one count per write (i.e., tracks 7 writes from processor 130 for each storage track 1110), a four-bit counter and five counts per write (i.e., tracks 3 writes from processor 130 for each storage track 1110), a six-bit counter and 7 counts per write (i.e., tracks 9 writes from processor 130 for each storage track 1110), etc.).

Processor 130, when utilizing the first thread, is further configured to destage storage tracks 1110 based on the spatial location of storage tracks 1110. A sorted list of storage tracks 1110 is maintained in processor 130 (e.g., in destage management module 1310) using a balanced tree. Destage scans looking for storage tracks 1110 to destage may traverse the balanced tree in the order of storage track location from the storage track 1110 including the lowest number to the storage track including the highest number, for example.

For sequential storage tracks 1110, the destage mechanisms discussed below ignore counters 1120 and destage sequential storage tracks 1110 when the destage scan comes across such sequential storage tracks 1110. This is designed to improve throughput since, for sequential storage tracks 1110, generally the entire stride is in cache 120. As a result, full stride destages may be accomplished, which are generally faster than partial stride destages. This scenario leads to freeing write space in cache 120 more quickly. In addition, throughput increases as sequential storage tracks 1110 are not continually re-written.

While contemporary destage mechanisms improve overall throughput, some transaction times may be increased, since selecting sequential storage tracks 1110 with a counter 1120 may lead to destage conflicts. Such a result may follow, from the following exemplary scenario. A write to a particular storage track needs to wait for a destage to complete. Storage tracks containing multiple records may require multiple updates, as some applications that write storage tracks sequentially may write one record at a time, and associated sequential storage tracks would have their counter set. Since current mechanisms generally ignore the counter for sequential storage tracks, a particular storage track being updated one record at a time may be destaged.

In addition to potentially longer transaction times, some working sets of storage tracks (e.g., IP Multimedia Subsystem (IMS) write ahead data set (WADS) tracks) are detected sequentially, but may not be written in a purely sequential fashion. For example, consider a working set of storage tracks 1-8 that are written in the flowing order: 4, 3, 2, 1, 8, 7, 6, 5. These storage tracks may be detected as being sequential in nature. As previously mentioned, working sets of storage tracks are updated frequently, and correspondingly are written to at a higher frequency. Some mechanisms will destage these working sets if they are detected as sequential.

In view of the foregoing, a need exists for a destage mechanism to reduce transaction times in scenarios involving such sequential storage tracks. Again, as previously mentioned, the destage mechanisms of the illustrated embodiments serve to address this need by providing for more aggressive destaging of sequential storage tracks in cache, refrain from destaging the last stride in the sequential streams currently being written to, and maintaining working sets of storage tracks (e.g., storage tracks that are updated frequently) in cache for longer periods. As a result, the illustrated embodiments provide for better throughput on cache 120 since sequential storage tracks 1110 are destaged more aggressively, slow down destages of pseudo-sequential working sets, and retain destage conflicts at a minimum since storage tracks 1110 that are being written to are not destaged.

To accomplish the foregoing, processor 130 is configured to examine a current storage track 1110 to determine if it is sequential in nature with respect to a previous storage track 1110. If the current storage track 1110 is sequential in nature, processor 130 is configured to locate a storage track 1110 that includes a location that is a predetermined number of storage tracks prior to the location of the current storage track (e.g., N-X locations). In other words, an earlier storage track in the stride is located, based on a predetermined formula. In one embodiment, by default, the predetermined number is twenty-eight (28) storage tracks 1110, although one of ordinary skill in the art will appreciate that the predetermined number may vary according to a particular application of system 100.

If the located storage track 1110 (i.e., the storage track 1110 that is located N-X storage tracks prior to the current storage track 110) is sequential with respect to the current storage track 1110 and has been modified, its associated counter 1120 is cleared or zeroed out. If the located storage track 1110 is not sequential with respect to the current storage track 1110 or has not been modified, the counter 1120 associated with the located storage track 1110 is not cleared or zeroed out. Processor 130 is further configured to perform a destage scan of storage tracks 1110 to destage storage tracks 1110 from cache 120.

When executing the computer-readable code in destage management module 1310, processor 130 is further configured to utilize a second thread to perform the destage scan, which decrements counters 1120 and destages storage tracks 1110 including a counter 1120 with a zero count. Specifically, processor 130 is configured to determine the amount of time a previous destage scan, divide this amount of time by a predetermined amount of time, and decrement each counter 1120 by this number of counts, truncated (or rounded down), and additionally decremented by one count.

In one embodiment, the predetermined amount of time that the previous destage scan time is divided by is 100 milliseconds. In other embodiments, the predetermined amount of time that the previous destage scan time is divided by is an amount of time less than 100 milliseconds. In yet another embodiment, the predetermined amount of time that the previous destage scan time is divided by is an amount of time greater than 100 milliseconds. Accordingly, the various embodiments of processor 130 contemplate that the predetermined amount of time that the previous destage scan time is divided by may be any predetermined amount of time. For example, if the previous destage scan time was 280 milliseconds and the predetermined amount is 100 milliseconds, processor 130 will decrement each counter 1120 by three (3) counts (i.e., (280 ms/100 ms) counts+1 count=3 counts) during the current destage scan.

In addition to decrementing counters 1120 during the current destage scan, processor 130 is configured to destage each storage track 1110 that includes an associated counter 1120 with a zero count. In addition, during the current destage scan processor 130 is configured to "skip" destaging each storage track 1110 that includes an associated counter 1120 with a count greater than zero. To accomplish this, processor 130 is configured to check each counter 1120 of each respective storage track 1110 during the destage scan. If the count on the counter 1120 for a particular storage track 1110 is greater than zero, processor 130 is configured to decrement the counter 1120 by the determined decrement amount for this particular destage scan and continue on to the next storage track 1110. If the count on the counter 1120 for a particular storage track 1110 is zero, processor 130 is configured to destage this particular storage track 1110.

Notably, if the count on the counter 1120 for a particular storage track 1110 is greater than zero, but less than the determined decrement amount for this particular destage scan, processor 130 is configured to zero out the counter 1120 for this particular destage scan and continue on to the next storage track 1110. For example, if the on the counter 1120 for a particular storage track 1110 is two (2) counts and the determined decrement amount for this particular destage scan is three (3), processor 130 will zero out the counter 1120 and continue on to the next storage track 1110.

Figure 2:
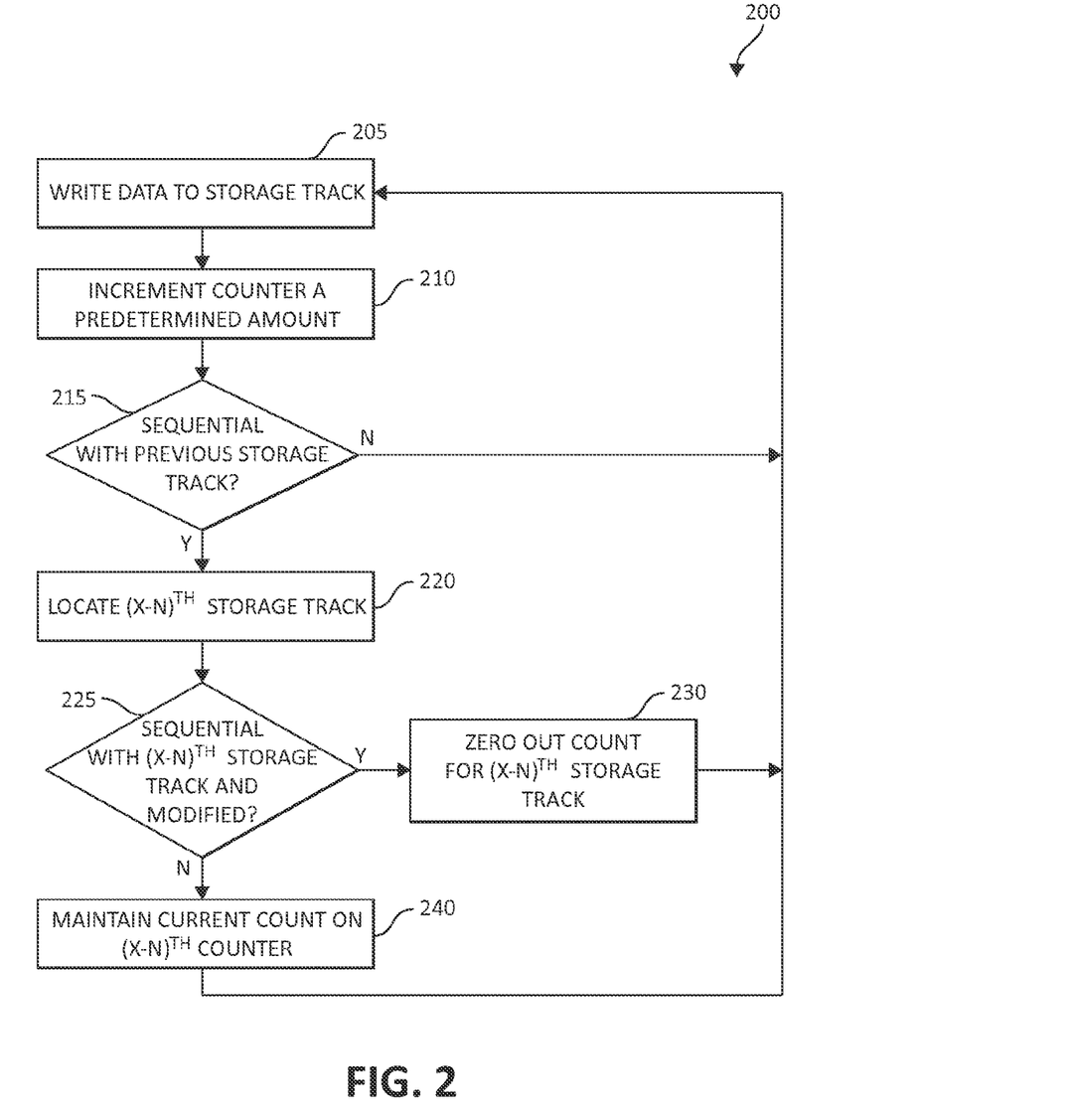
FIG. 2 is a flow diagram of one embodiment of a method for writing data to a plurality of storage tracks and incrementing a multi-bit counter in the cache of FIG. 1.

Turning now to FIG. 2, FIG. 2 is a flow diagram of one embodiment of a method 200 for writing data to a plurality of storage tracks (e.g., storage tracks 1110) and incrementing each counter (e.g., counters 1120) in a cache (e.g., cache 120). At least in the illustrated embodiment, method 200 begins by a processor (e.g., processor 130) writing data to one or more storage tracks (block 205) and incrementing the counter associated each storage track that was written to by a predetermined amount (block 210).

In one embodiment, the predetermined amount that each counter is incremented is three (3) counts each time the processor writes to a respective storage track. In another embodiment, the predetermined amount that each counter is incremented is one (1) count or two (2) counts each time the processor writes to a respective storage track. In yet another embodiment, the predetermined amount that each counter is incremented is a number of counts greater than three counts each time the processor writes to a respective storage track.

Method 200 further comprises determining if the storage track that is currently being written to is sequential with respect to the immediately previous storage track that was written to (block 215). If the storage track that is currently being written to is not sequential with respect to the immediately previous storage track that was written to, method 200 comprises returning to writing to the one or more storage tracks (block 205).

If the storage track that is currently being written to is sequential with respect to the immediately previous storage track that was written to, method 200 comprises locating a storage track that includes a location that is a predetermined number of storage tracks prior to the location of the current storage track (e.g., N-X locations) (block 220). In other words, an earlier storage track in the stride is located, based on a predetermined formula. In one embodiment, by default, the predetermined number is twenty-eight (28) storage tracks, although one skilled in the art will appreciate that the predetermined number may vary according to a particular application.

Method 200 further comprises determining if the located storage track (i.e., the storage track that is located N-X storage tracks prior to the current storage track (e.g., 28 storage tracks prior to the current storage track)) is sequential with respect to the current storage track and has been modified (block 225). If the located storage track is sequential with respect to the current storage track and has been modified, its associated counter 1120 is cleared or zeroed out (block 230). Method 200 then returns to writing to the one or more storage tracks (block 205).

If the located storage track is not sequential with respect to the current storage track and/or has not been modified, method 200 comprises maintaining the count (e.g., not clearing or zeroing out) on its associated counter 1120 (block 240). Method 200 then returns to writing to the one or more storage tracks (block 205).

Figure 3:
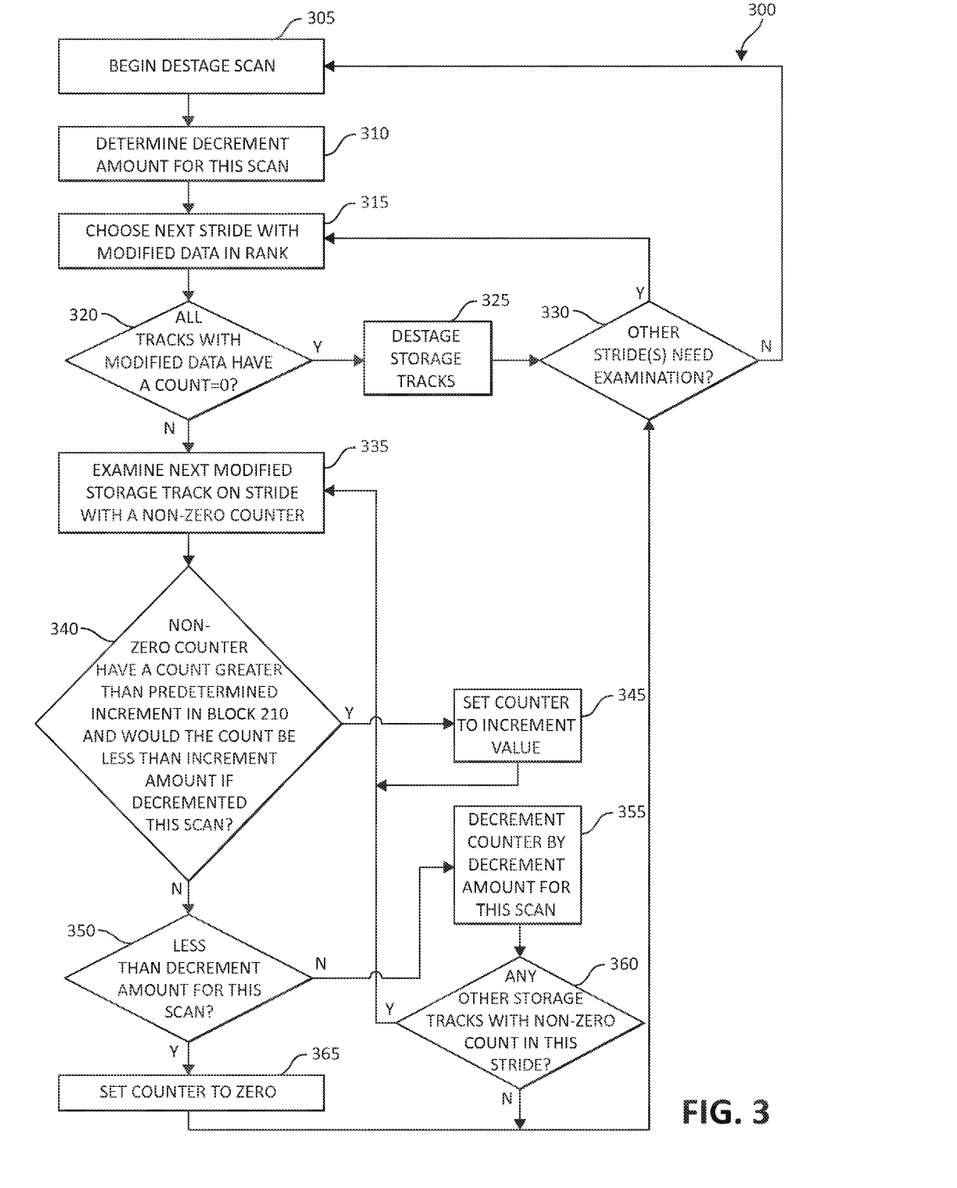
FIG. 3 is a flow diagram of one embodiment of a method for destaging storage tracks from the cache in FIG. 1 utilizing a multi-bit counter.

With reference now to FIG. 3, FIG. 3 is a flow diagram of one embodiment of a method 300 for destaging storage tracks (e.g., storage tracks 1110) from a cache (e.g., cache 120) utilizing multi-bit counters (e.g., counter 1120). At least in the illustrated embodiment, method 300 begin by beginning a destage scan (block 305).

During the destage scan, method 300 comprises determining an amount to decrement each counter during the destage scan (block 310). In one embodiment, the amount to decrement each counter during the destage scan comprises determining the amount of time of a previous destage scan, dividing this amount of time by a predetermined amount of time, truncating (or rounding down) the result, and adding one additional count. In various embodiments, the predetermined amount of time that the previous destage scan time is divided by is 100 milliseconds. In other embodiments, the predetermined amount of time that the previous destage scan time is divided by is an amount of time less than 100 milliseconds. In yet another embodiment, the predetermined amount of time that the previous destage scan time is divided by is an amount of time greater than 100 milliseconds. Accordingly, the various embodiments contemplate that the predetermined amount of time that the previous destage scan time is divided by may be any predetermined amount of time. For example, if the previous destage scan time was 310 milliseconds and the predetermined amount is 100 milliseconds, the amount to decrement each counter during the destage scan is four (4) counts (i.e., (310 ms/100 ms) counts+1 count=4 counts).

Method 300 further comprises examining the counter associated with a particular storage track (block 315) and determining if the count on the counter is zero (block 320). If the count on the counter for the particular storage track is zero, method 300 comprises destaging this particular storage track (block 325). Method 300 then determines if there are other storage tracks in the cache that need to be examined during the current destage scan (block 330).

If there are one or more other storage tracks in the cache that need to be examined during the current destage scan, method 300 examines the next storage track (block 315). If there are no other storage tracks in the cache that need to be examined during the current destage scan, method 300 begins the next destage scan (block 305).

If the count on the counter for the particular storage track is greater than zero or is non-zero (see block 320), method 300 comprises decrementing the counter associated with this particular storage track by the determined decrement amount for this particular destage scan (block 335). Method 300 then determines if there are other storage tracks in the cache that need to be examined during the current destage scan (block 330).

If there are other storage tracks in the cache that need to be examined during the current destage scan, method 300 examines the next storage track (block 315). If there are no other storage tracks in the cache that need to be examined during the current destage scan, method 300 begins the next destage scan (block 305).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for destaging storage tracks from a cache configured to store data in a plurality of storage tracks and each storage track including a multi-bit counter, the method comprising:
   incrementing the multi-bit counter on each respective storage track a predetermined amount each time the processor writes to a respective storage track;
   decrementing each multi-bit counter each scan cycle; and
   destaging each storage track that includes a zero count.

2. The method of claim 1, further comprising:
   writing data to at least one of the plurality of storage tracks;
   scanning each of the plurality of storage tracks in each of a plurality of scan cycles;
   determining if a first storage track currently being written to is sequential with respect to an immediately previous storage track written to;
   locating a second storage track positioned a predetermined number of storage tracks prior to the first storage track; and
   decrementing the counter associated with the second storage track to the zero count if the second storage track is also sequential with respect to the current storage track and was previously written to.

3. The method of claim 2, wherein incrementing the multi-bit counter on each respective storage track comprises incrementing a four-bit counter by the predetermined amount.

4. The method of claim 2, wherein incrementing the multi-bit counter on each respective storage track comprises incrementing each multi-bit counter on each respective storage track three counts each time the processor writes to a respective storage track such that each multi-bit counter is capable of tracking five write operations on each storage track.

5. The method of claim 4, wherein decrementing each multi-bit counter each scan cycle comprises:
   determining an amount of time of a previous scan cycle;
   dividing the amount of time of the previous scan cycle by 100 milliseconds, truncated, to determine a factor count; and
   decrementing each multi-bit counter in a next scan by one count and the factor count.

6. The method of claim 5, wherein locating the second storage track comprises identifying a storage track positioned twenty-eight (28) storage tracks prior to the first storage track as the second storage track.

7. The method of claim 6, further comprising declining to destage storage tracks with a count greater than zero.

8. A system for destaging storage tracks from cache, comprising:
   a cache configured to store data in a plurality of storage tracks, each storage track including a multi-bit counter; and
   a processor coupled to the cache, wherein the processor is configured to execute a first thread and a second thread, wherein the first thread is configured to:
      increment the multi-bit counter on each respective storage track a predetermined amount each time the processor writes to a respective storage track, and
   wherein the second thread is configured to:
      decrement each multi-bit counter each scan cycle, and
      destage each storage track in the stride during a scan cycle if each multi-bit counter includes a zero count and each storage track has been modified.

9. The system of claim 8, wherein the first thread is further configured to:
   write data to the plurality of storage tracks;
   determine if a first storage track currently being written to is sequential with respect to an immediately previous storage track written to;
   locate a second storage track positioned a predetermined number of storage tracks prior to the first storage track;
   decrement the counter associated with the second storage track to the zero count if the second storage track is also sequential with respect to the current storage track and was previously written to; and
   wherein the second thread is configured to:
      scan each of the plurality of storage tracks on a stride in each of a plurality of scan cycles.

10. The system of claim 9, wherein the multi-bit counter is a four-bit counter including a count from 0-15.

11. The system of claim 10, wherein the first thread is configured to increment each multi-bit counter on each respective storage track three counts each time the processor writes to a respective storage track such that each multi-bit counter is capable of tracking five write operations on each storage track.

12. The system of claim 11, wherein, in decrementing each multi-bit counter each scan cycle, the second thread is configured to:
- determine an amount of time of a previous scan cycle;
- divide the amount of time of the previous scan cycle by 100 milliseconds, truncated, to determine a factor count; and
- decrement each multi-bit counter in a next scan by one count and the factor count.

13. The system of claim 12, wherein the second storage track is positioned twenty-eight (28) storage tracks prior to the first storage track.

14. The system of claim 13, wherein the second thread is configured to not destage each storage track in the stride if one or more multi-bit counters include a non-zero count.

15. A physical computer storage memory comprising a computer program product method for destaging storage tracks from a cache configured to store data in a plurality of storage tracks and each storage track including a multi-bit counter, the physical computer storage medium comprising:
- computer code for incrementing the multi-bit counter on each respective storage track a predetermined amount each time the processor writes to a respective storage track;
- computer code for decrementing each multi-bit counter each scan cycle, and
- computer code for destaging each storage track in the stride during a scan cycle if each multi-bit counter includes a zero count and each storage track has been modified.

16. The physical computer storage memory of claim 15, further comprising:
- computer code for writing data to at least one of the plurality of storage tracks;
- computer code for scanning each of the plurality of storage tracks on a stride in each of a plurality of scan cycles;
- computer code for determining if a first storage track currently being written to is sequential with respect to an immediately previous storage track written to;
- computer code for locating a second storage track positioned a predetermined number of storage tracks prior to the first storage track; and
- computer code for decrementing the counter associated with the second storage track to the zero count if the second storage track is also sequential with respect to the current storage track and was previously written to.

17. The physical computer storage memory of claim 16, wherein:
- the computer code for incrementing the multi-bit counter on each respective storage track comprises computer code for incrementing a four-bit counter by the predetermined amount; and
- the computer code for incrementing the multi-bit counter on each respective storage track comprises computer code for incrementing each multi-bit counter on each respective storage track three counts each time the processor writes to a respective storage track such that each multi-bit counter is capable of tracking five write operations on each storage track.

18. The physical computer storage memory of claim 17, wherein the computer code for decrementing each multi-bit counter each scan cycle comprises:
- computer code for determining an amount of time of a previous scan cycle;
- computer code for dividing the amount of time of the previous scan cycle by 100 milliseconds, truncated, to determine a factor count; and
- computer code for decrementing each multi-bit counter in a next scan by one count and the factor count.

19. The physical computer storage memory of claim 17, wherein the computer code for locating the second storage track comprises computer code for identifying a storage track positioned twenty-eight (28) storage tracks prior to the first storage track as the second storage track.

20. The physical computer storage memory of claim 19, further comprising computer code for declining to destage each storage track in the stride if one or more multi-bit counters include a non-zero count.

* * * * *